Figure 1:
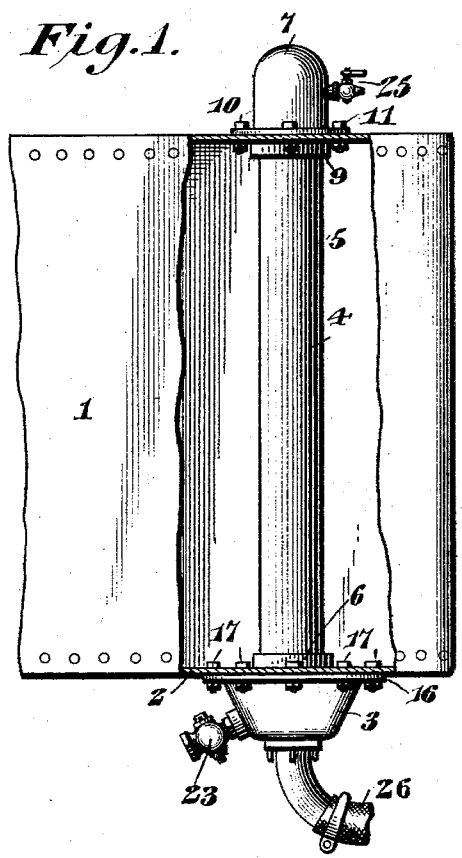

No. 699,331. Patented May 6, 1902.

C. LINSTROM.
COMBINED FEED WATER SIPHON AND TRAP.
(Application filed Jan. 4, 1902.)

(No Model.)

Witnesses
Jas. F. McCutchan
Louis G. Julihn

Charles Linstrom, Inventor
By C. G. Siggers
Attorney

UNITED STATES PATENT OFFICE.

CHARLES LINSTROM, OF VICKSBURG, MISSISSIPPI.

COMBINED FEED-WATER SIPHON AND TRAP.

SPECIFICATION forming part of Letters Patent No. 699,331, dated May 6, 1902.

Application filed January 4, 1902. Serial No. 88,443. (No model.)

*To all whom it may concern:*

Be it known that I, CHARLES LINSTROM, a citizen of the United States, residing at Vicksburg, in the county of Warren and State of Mississippi, have invented a new and useful Combined Feed-Water Siphon and Trap, of which the following is a specification.

My present invention relates to a novel feed-water siphon and trap designed particularly for use in connection with the tender-tanks of locomotives, and is an improvement in the art exemplified in my former patent, No. 568,620, dated September 29, 1896. The device illustrated in said patent includes a siphon the legs or branches of which are housed within the tank in laterally-spaced relation. Said legs or branches are connected by a return located above the tender, and one of them is rigidly connected to both the top and bottom walls of the tender. The return is provided with a lubricating and air cock for breaking the siphon when the device is disconnected from the locomotive and for permitting the introduction of lubricating-oil, which is passed to the locomotive with the feed-water. One leg of the siphon has a flared lower extremity extended below the bottom of the tender and into a mud-well, thus locating the intake of the siphon at a point below the bottom of the tank to permit the complete evacuation of the latter.

The object of my present invention is to simplify the construction described in my patent and to adapt the device for convenient application to locomotive-tanks of various constructions during the course of construction of the tank or subsequently.

A further object of the invention is to so relate the various parts of the siphon as to accommodate the relative movement of the top and bottom walls of the tank incident to contraction and expansion due to atmospheric changes or to the movement of the contained body of water.

Further objects of the invention are to facilitate the removal of either leg or branch of the siphon for purposes of replacement or repair without in any manner interfering with the other leg or branch and to include as a feature of the device a trap containing means for effectually straining the water before the latter passes to the interior of the siphon and constructed in a manner to insure the thorough cleansing of the trap of all accumulated sediment.

To the accomplishment of these objects without sacrificing any of the advantages of the earlier construction the invention comprehends as a preferred embodiment thereof that construction and arrangement hereinafter more fully described, illustrated in the accompanying drawings, and succinctly defined in the appended claims.

Figure 2:
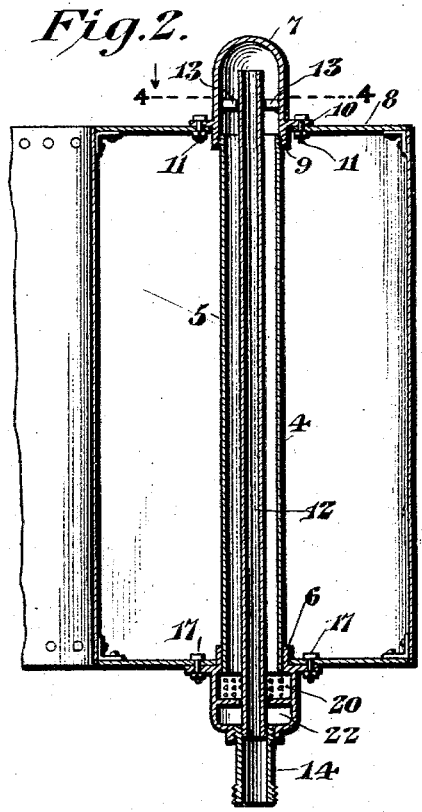
Figure 3:
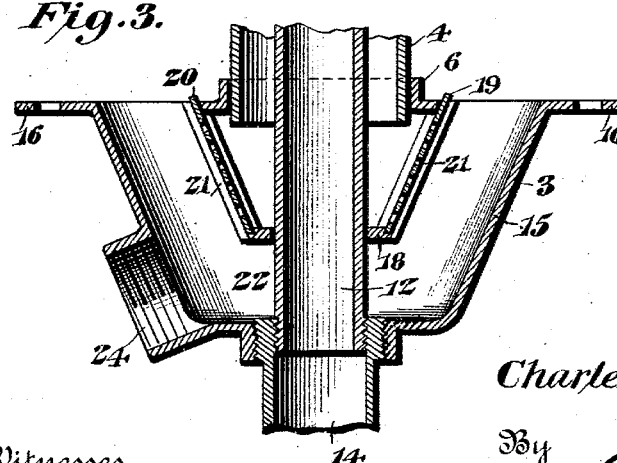
Figure 4:
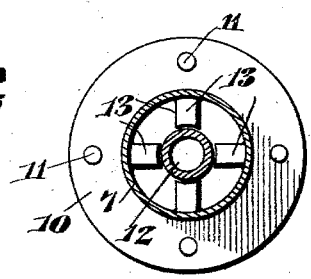

In said drawings, Figure 1 is an elevation of a portion of a locomotive-tender equipped with my invention and having the side broken away. Fig. 2 is a vertical sectional view through one leg of the tender-tank, showing the siphon and trap in diametrical section. Fig. 3 is an enlarged sectional view at right angles to the line of section in Fig. 2 and showing the trap and the lower portion of the siphon detached, and Fig. 4 is an enlarged sectional view on the line 4 4 of Fig. 2.

Like numerals of reference are employed to designate corresponding parts throughout the views.

As has been stated, my invention comprehends the equipment of a water-tank with improved means for effecting the withdrawal of water therefrom for the supply of an engine-boiler, but is designed with special reference to locomotives, and in such connection is mounted in and upon one leg or side branch of the tender-tank, (indicated in the drawings by the numeral 1.) To the bottom wall or sheet 2 of the tank 1 is bolted or otherwise secured a trap 3, through which water from the interior of the tank is designed to pass into the lower open end of the ascending leg or branch 4 of a siphon 5, the major portion of which is housed within the tank and protected thereby. The lower end of the branch 4 of the siphon is slidably fitted within an annular guide-flange 6, upstanding from the top wall of the trap 3, and the upper end of said branch is screwed in or otherwise attached to the lower end of a return or dome 7, bolted upon the top wall or sheet 8 of the tank 1. The mode of attachment of the dome 7 to the wall 8 of the tank and to the ascending leg 4 of the siphon is immaterial, as stated; but by preference the lower edge of the dome is extended through the wall 8 and has threaded engagement with the leg 4, as indicated at 9, and is provided with a horizontal annular flange 10, imposed upon the wall 8 and secured by bolts 11, as shown.

The descending leg or branch 12 of the siphon 5 is located concentrically within the ascending leg 4 thereof and extends above the wall 8 of the tank and into the dome 7, where its upper end is guided between the inner ends of a series of guide-lugs 13, projecting inwardly from the wall of the dome. At its lower end the leg 12 is supported by the bottom wall of the trap through the medium of a hose-nipple 14, screwed into said wall and having threaded connection in turn with the leg 12. It will thus be observed that while the elements or legs of the siphon are properly related to permit the siphoning of the water from the tender-tank to the locomotive-boiler they are relatively movable longitudinally to accommodate such slight approach or recession of the top and bottom walls of the tank as may be caused by the movement of the water within the tank or by contraction and expansion incident to changes in atmospheric conditions. It will furthermore appear that the legs of the siphon may be removed for purposes of replacement or repair without in any manner affecting each other and without necessitating the detachment of the trap 3 from the tank. If it is desired to remove the ascending leg 4, it is simply necessary to release the dome from the wall 8, when, as will be evident, the dome and said leg may be lifted out of the tank independently of the other elements of the structure. Similarly if it is desired to remove the descending leg the nipple 14 is unscrewed from the trap and the descending leg is withdrawn endwise.

We now come to a consideration of the novel trap comprehended by my invention and designed with special reference to the straining of the water passing to the siphon and to the removal of the accumulated drainings by reverse circulation of the water through the sediment-chamber of said trap. The trap 3 is of generally oblong shape, with downwardly-converging end walls 15, and is formed at its upper edge with a horizontal bolt-flange 16, imposed against the under side of the wall 2 and secured by bolts 17, as shown. Within the trap at a point below the lower end of the siphon-leg 4 is disposed a horizontal partition 18, pierced by and constituting a guide for the inner or descending leg 12 and also constituting a stop for a pair of foraminous strainers or slides 19 and 20, slidably received within suitable guides 21 and extending from the partition 18 to the top of the trap. These strainers are designed to thoroughly cleanse the water as it passes through the trap to the ascending leg of the siphon, and that part of the trap lying below and outside of the strainers will therefore constitute a sediment-chamber 22, which may be cleared of the accumulated sediment by the opening of an escape-valve 23, controlling an opening 24 in one of the walls 15, at or adjacent to the bottom of the tank.

To prevent accidental siphoning of water from the tank when the latter is not in communication with the engine-boiler, a lubricating and air cock 25 is provided upon the dome 7, and this cock may also be employed for the introduction of lubricating-oil to the interior of the siphon, from whence it will pass to the boiler with the feed-water. To the hose-nipple 14 is attached a short section of flexible hose 26, which in practice is coupled to a similar section in communication with the engine-boiler.

In operation, the feed-pipe of the locomotive being in communication with the siphon, the injector is caused to exhaust the air from the siphon and to inaugurate a flow of water from the tank to the interior of the trap 3, thence through the strainers 19 and 20, through the ascending leg 4 of the siphon, into the dome 7, back through the descending leg 12 of said siphon, and thence through the hose 26 and the feed-pipe of the locomotive to the boiler thereof. The flow of feed-water from the tank to the boiler will continue as long as is permitted by the injector, and when the hose-sections are uncoupled the siphon is broken by the opening of the cock 25 to prevent the escape of water from the tank.

If at any time it is desired to draw off the sediment from the sediment-chamber of the trap, it is simply necessary to open the valve 23, and thus permit the water from the tank to flow freely through the sediment-chamber for the purpose of flushing the same.

From the foregoing it will be observed that I have produced a simple, inexpensive, and efficient siphon and trap for feed-water tanks, organized for convenient disassociation of the parts and for such relative movement thereof as may be necessary to prevent possible derangement under the varying conditions of use; but while the present embodiment of the invention is thought at this time to be preferable I wish to reserve the right to effect such changes, modifications, and variations of the illustrated structure as may be suggested by experience and experiment and embraced within the scope of the appended claims.

What I claim is—

1. In a device of the character described, the combination with a tank, of a siphon housed therein and having relatively movable concentric legs, one of which is in communication with the interior of the tank, and each of which is secured to a separate wall of said tank.

2. In a device of the character described, the combination with a tank, of a siphon housed therein and having concentric legs communicating with each other at a point above the tank.

3. In a device of the character described, the combination with a tank, of a siphon housed therein and having concentric legs communicating with each other at a point above the tank, one of said legs being extended below the tank and having communication with the interior thereof.

4. In a device of the character described, the combination with a tank, of a siphon having both of its legs mounted for independent automatic movement, to accommodate the movement of the tank-walls.

5. In a device of the character described, the combination with a tank, the walls of which are capable of relative movement, of a siphon housed therein and having its legs carried by different walls of the tank, and disposed for relative endwise movement to accommodate the movement of said walls.

6. In a device of the character described, the combination with a tank, the walls of which are capable of relative movement, of a siphon having concentric legs secured to opposite walls of the tank and disposed for relative endwise movement to accommodate the movement of said walls.

7. In a device of the character described, the combination with a tank, of a siphon having concentric legs secured to opposite walls of the tank and disposed for relative endwise movement, and a guide movable with each wall and disposed to receive the leg secured to the opposite wall.

8. In a device of the character described, the combination with a tank, of a siphon having concentric legs, and a dome secured to one wall and establishing communication between the legs of the siphon.

9. In a device of the character described, the combination with a tank, of a dome and a trap carried by the opposite walls thereof, and a siphon having concentric legs carried by the dome and trap, respectively.

10. In a device of the character described, the combination with a tank, of a dome and trap carried by the opposite walls thereof and each provided with a guide, and a siphon the legs of which are carried by the dome and trap, respectively, and are slidably received by the guides.

11. In a device of the character described, the combination with a tank, of a dome located above the tank, a trap located below the tank, and a siphon having its legs extended from the dome and trap, respectively, and located one within the other.

12. In a device of the character described, the combination with a tank, of a dome secured to the top wall of the tank and having the ascending leg of a siphon attached thereto, a trap secured to the bottom wall of the tank, a hose-nipple detachably secured to said trap, and the descending leg of a siphon carried by the hose-nipple and extended through the ascending leg and into the dome.

13. In a device of the character described, the combination with a tank, of a trap communicating with the interior of the tank, and a siphon having both its inlet and outlet ends retained by the trap.

14. In a device of the character described, the combination with a tank, of a trap having communication with the interior thereof, and a siphon, one leg of which is supported by the trap, and the other leg of which is retained by the trap against lateral movement but is movable independently thereof in an endwise direction.

15. In a device of the character described, the combination with a tank, of a trap communicating with the interior thereof, a siphon having its intake in communication with the trap, and a strainer located within the trap and disposed to prevent debris from passing to the siphon with the water.

16. In a device of the character described, the combination with a tank, of a trap communicating therewith, a siphon having its intake in communication with the trap, and a removable strainer slidably mounted in the trap to strain the water passing to the siphon.

17. In a device of the character described, the combination with a tank, of a trap secured to the bottom wall thereof and communicating therewith, a siphon having its intake end extended into the trap and having its descending leg extended through the trap, and a pair of removable strainer-plates located within the trap and disposed to prevent debris from passing into the siphon with the water.

18. In a device of the character described, the combination with a tank, of a trap secured to the bottom wall thereof and communicating with its interior, said trap being provided with a partition and with a pair of removable strainer-plates resting upon the partition, means for drawing off sediment from the bottom of the tank, and a siphon, the ascending leg of the siphon being in communication with that portion of the tank defined between the partition and the strainer-plates, and the descending leg of the siphon being extended through the trap for delivery therebelow.

19. In a device of the character described, the combination with a tank, of a trap, a hose-nipple screwed into the bottom of the trap, and a siphon having its intake communicating with the trap and having its descending leg supported by the hose-nipple.

20. In a device of the character described, the combination with a tank, of a siphon having concentric legs, a dome establishing communication between the legs of the siphon, and an air-cock for admitting air to the dome to break the siphon.

21. In a device of the character described, the combination with a tank, of a siphon having independently-movable legs secured to the opposite walls of the tank, whereby relative movement of the walls will be accommodated by corresponding relative movement of the siphon-legs, and means exterior to the tank for breaking the siphon.

In testimony that I claim the foregoing as my own I have hereto affixed my signature in the presence of two witnesses.

CHARLES LINSTROM.

Witnesses:
MICHAEL J. DONOVAN,
WM. DE JONG.